United States Patent
Chamaret et al.

(10) Patent No.: US 8,264,602 B2
(45) Date of Patent: Sep. 11, 2012

(54) METHOD FOR IMAGE FORMAT CONVERSION WITH INSERTION OF AN INFORMATION BANNER

(75) Inventors: Christel Chamaret, Chantepie (FR); Olivier Le Meur, Talensac (FR); Alexandre Ninassi, Osse (FR); Fabrice Urban, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 472 days.

(21) Appl. No.: 12/586,931

(22) Filed: Sep. 30, 2009

(65) Prior Publication Data

US 2010/0188430 A1 Jul. 29, 2010

(30) Foreign Application Priority Data

Oct. 2, 2008 (FR) ..................... 08 56661

(51) Int. Cl.
*H04N 7/01* (2006.01)
*H04N 9/74* (2006.01)

(52) U.S. Cl. .............. 348/441; 348/445; 348/600

(58) Field of Classification Search .............. 348/441, 348/445, 443, 458, 459, 913, 589, 600; *H04N 7/01, H04N 11/20, 9/74, 9/76*
See application file for complete search history.

(56) References Cited

U.S. PATENT DOCUMENTS

| | | | |
|---|---|---|---|
| 2004/0008276 A1* | 1/2004 | Moritani | 348/445 |
| 2006/0064716 A1 | 3/2006 | Sull et al. | |
| 2006/0232703 A1* | 10/2006 | Enomoto | 348/445 |
| 2008/0088740 A1 | 4/2008 | Kondo | |

FOREIGN PATENT DOCUMENTS

EP 1850587 10/2007

OTHER PUBLICATIONS

Chen L-Q et al.: "A Visual Attention Model for Adapting Images on Small Displays" Multimedia Systems, ACM, New York, NY, US, vol. 9, No. 4, Oct. 1, 2003, pp. 353-364.
Search Report dted Apr. 20, 2009.

* cited by examiner

*Primary Examiner* — Sherrie Hsia
(74) *Attorney, Agent, or Firm* — Robert D. Shedd; Jeffrey M. Navon; Jerome G. Schaefer (57) ABSTRACT

The present invention relates to a method for image processing to generate, from a source image having a predefined width to height ratio, called initial ratio, and an information banner having predefined width to height ratio, called banner ratio, a final image having a width called final and a height called final and for which the width to height ratio, called final ratio, is different from the initial ratio, comprising the following steps:

determine a ratio called useful according to the final ratio and the banner ratio, extract from the source image a part of the image having a width to height ratio equal to the useful ratio, and generate, from the part of the image extracted and the information banner, a final image comprising in juxtaposition an image representative of the extracted image part having a width to height ratio equal to the useful ratio and an image representative of the information banner having a width to height ratio equal to the banner ratio.

5 Claims, 8 Drawing Sheets

METHOD FOR IMAGE FORMAT CONVERSION WITH INSERTION OF AN INFORMATION BANNER

This application claims the benefit, under 35 U.S.C. §119 of EP Patent Application 0856661, filed Oct. 2, 2008.

1. FIELD OF THE INVENTION

The present invention relates to a method for processing images to generate, from a source image and an information banner, a final image having a width to height ratio different to the width to height ratio of the source image. The invention is situated both in the domain of format conversion and in the domain of information banner insertion, such as publicity banners, in a sequence of video images.

2. BACKGROUND OF THE INVENTION

Figure 1:
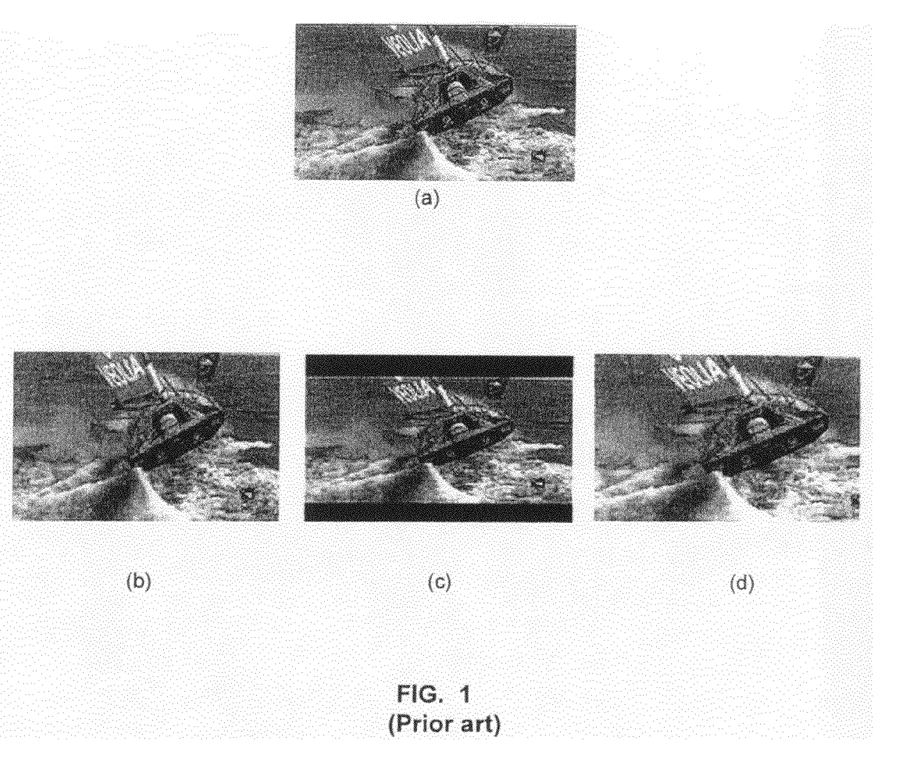
FIGS. 1(a) to 1(d), already described, showing the format conversion techniques of the prior art.

In the format conversion domain, more than one technique exists and, in all of these techniques, a readjustment of the image size is carried out. These different techniques are shown in FIGS. 1(a) to 1(d). FIG. 1(a) shows a source image of format 16:9 to be converted into a final image of format 4:3. A first technique illustrated by the FIG. 1(b) consists in applying to the source image an anamorphic distortion that compresses it in the sense of its width. The final image is then deformed. A second technique shown by FIG. 1(c) consists in adding black vertical and/or horizontal bands around the source image to compensate the differences in size between the source image and the final image. In the example of FIG. 1(c), horizontal black bands are added above and below the source image. This technique is commonly called "letterbox". In the case of vertical black bands, the technique is called "pillarbox". A third technique shown by FIG. 1(d) consists in displaying only a part of the source image by cropping the source image on the sides or at the upper and lower edges. This technique is known as "cropping".

In all of these techniques, the readjustment of the image size leads to an under-exploitation of the surface of the screen displaying the final image ("pillarbox" or "letterbox" technique) or a deformation of the image (anamorphic distortion) or a loss of useful content that can be severe ("cropping").

Moreover, the insertion of an information banner, such as a publicity banner, in an image is commonly performed by placing the banner on a part of the image, for example the lower part of the image. This banner is possibly displayed in transparency on the image to limit the loss of visual information contained in the image. This insertion of an information banner is usually carried out outside of the context of format conversion. If the two operations are carried out successively without combining them, that is to say that an information banner is inserted in a cropped image following a format conversion, the loss of information is then accentuated.

3. SUMMARY OF THE INVENTION

One purpose of the invention is to propose a method for format conversion with automatic insertion of an information banner.

Another purpose of the invention is to overcome the previously cited disadvantage by proposing a method for image processing in which the insertion of an information banner is taken into account during the format conversion.

The invention relates to a method for image processing to generate, from a source image having a predefined width to height ratio, called initial ratio, and an information banner having predefined width to height ratio, called banner ratio, a final image having a width called final and a height called final and for which the width to height ratio, called final ratio, is different from said initial ratio, comprising the following steps:

determine, from said final ratio and said banner ratio, a width to height ratio, called useful ratio, of an image called useful so that, for a useful image and an information banner having a width equal to a final width, the height of the useful image is equal to the difference between the final height and the height of the information banner or so that, for a useful image and an information banner having a height equal to the final height, the width of the useful image is equal to the difference between the final width and the width of the information banner, extract from the source image a part of the image having a width to height ratio equal to the useful ratio, and generate, from the extracted image part and the information banner, a final image comprising in juxtaposition an image representative of said extracted image part and an image representative of said information banner.

Thus, the width to height ratio (or "aspect ratio") of the information banner is taken into account to determine the width to height ratio of the image part to be extracted from the source image.

Advantageously, the image part extracted is determined according to zones of perceptual interest of the source image so that the zones of the source image presenting the most interest for the viewer are found in the extracted image.

According to a particular embodiment, the image representative of the extracted image part is an image sub-sampled from the extracted source part if the width of the extracted image part is greater than the final width and an image over-sampled from the extracted image part if the width of the extracted image part is less than the final width. Likewise, the image representative of the information banner is a sub-sampled image of the information banner if the width of is the information banner is greater than the final width and an over-sampled image of the information banner if the width of the information banner is less than the final width.

Advantageously, the method of the invention comprises a preliminary step of selection of the information banner according to the metadata associated with said source image. The metadata employed for this step are for example information on the content of the source image. Thus an information banner is preferably selected whose content is in ratio with the content of the source image. If the information banner is a publicity banner, a publicity matched with the source image is selected.

4. BRIEF DESCRIPTION OF THE DRAWINGS

The invention will be better understood, and other purposes, details, characteristics and advantages will appear more clearly over the following detailed explanatory description of a preferred embodiment of the invention, with reference to annexed diagrammatical drawings among which.

5. DETAILED DESCRIPTION OF PREFERRED EMBODIMENTS

According to the invention, the width to height ratio of the image part to be extracted from the source image to generate the final image is determined according to the width to height ratio of the final image and the width to height ratio of the information banner. In the remainder of the description, $L_{final}$ and $H_{final}$ designate respectively the width and the height of the final image and $R_{final}$ designates the ratio between the width $L_{final}$ and the height $H_{final}$. Likewise $L_{initial}$ and $H_{initial}$ designate respectively the width and the height of the source image and $R_{initial}$ designates the ratio between the width $L_{initial}$ and the height $H_{initial}$. Finally $L_{band}$ and $H_{band}$ designate respectively the width and the height of the information banner and $R_{band}$ designates the ratio between the width $L_{band}$ and the height $H_{band}$.

Figure 2:
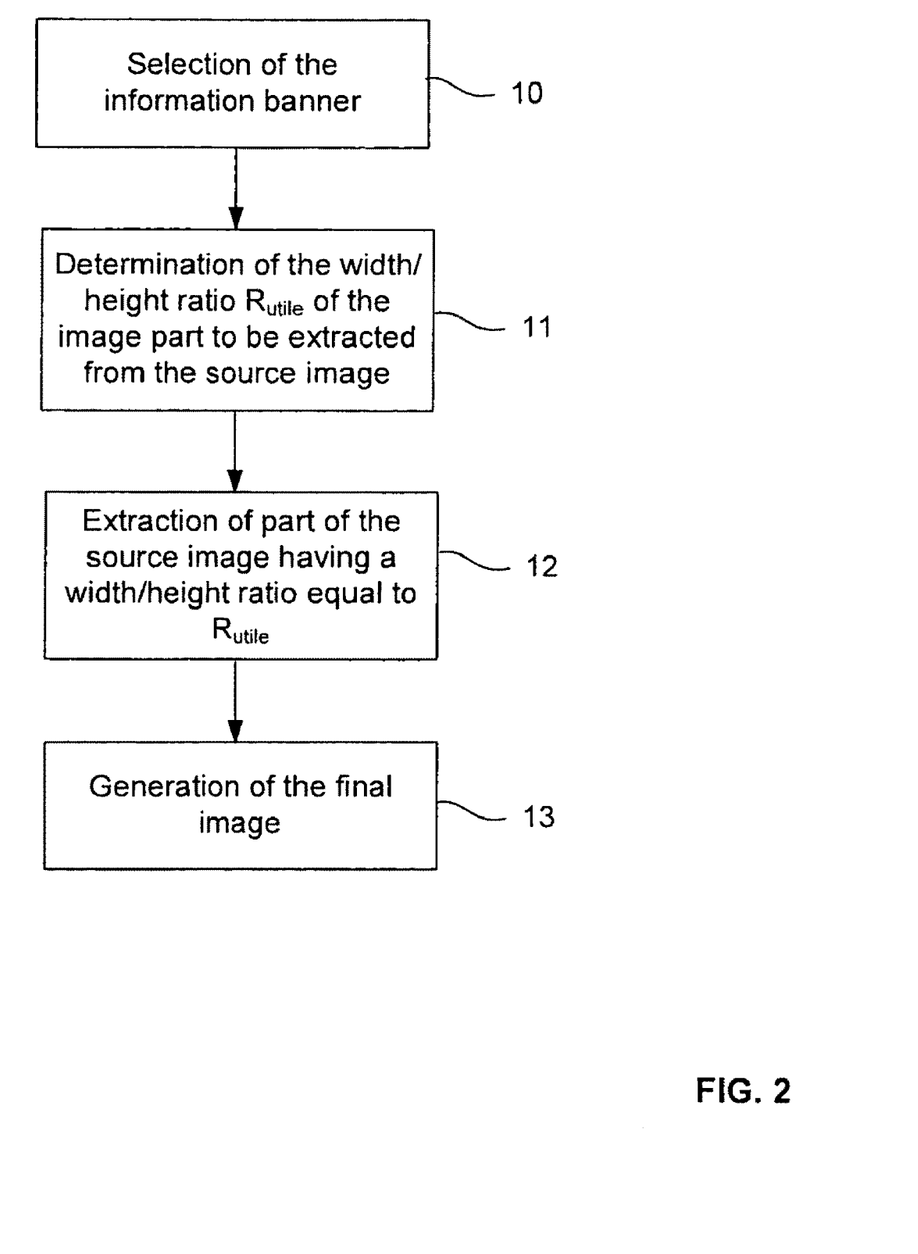
FIG. 2 shows a flowchart of the steps of the method according to the invention.

FIG. 2 shows a preferred embodiment of the method of the invention. According to a first step, referenced 10, an information banner is selected. This information banner is a banner displaying any type of information (weather, stock-market, news, scores, publicity, etc.). In the case of a publicity information banner, the publicity to be displayed is advantageously determined according to the metadata associated with the source image. These metadata contain for example information on the content of the source image. The publicity to be displayed is then selected so that its content is matched with the content of the source image. For example, if the source image relates to a sporting event, a publicity linked with sport, for example a publicity for a brand of sportswear, is selected.

According to a step 11, the width to height ratio is then determined on the image part to be extracted from the source image. This ratio, called the useful ratio, is noted $R_{utile}$ and is determined from the ratio $R_{final}$ and the ratio $R_{band}$. It is equal to the ratio of a width $L_{utile}$ to a height $H_{utile}$.

Figure 3:
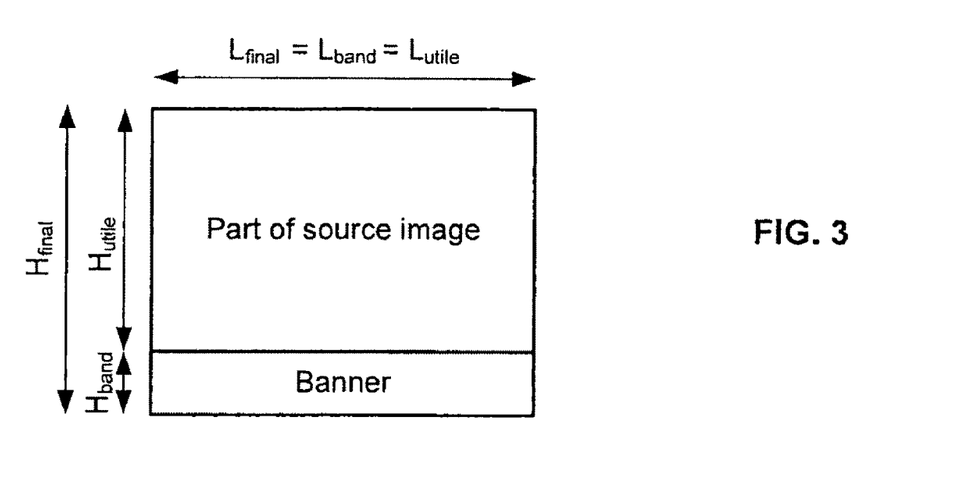
FIG. 3 shows the dimensions of the part of the source image and of the information banner composing the final image in the case where the information banner is positioned below the source image part.

According to the invention, if the information banner is placed below the part of the source image extracted as shown in FIG. 3, the useful ratio is determined in the following way:

$$R_{utile} = \frac{L_{utile}}{H_{utile}} = \frac{L_{final}}{H_{utile}} = \frac{L_{final}}{H_{final} - H_{band}} = \frac{\frac{L_{final}}{H_{final}}}{1 - \frac{H_{band}}{H_{final}}} = \frac{R_{final}}{1 - \frac{R_{final}}{R_{band}}}$$

Hence, for the conversion of a source image of format 16:9 into a final image of format 4:3 with an information banner having a ratio equal to 5:2, the useful ratio of the image part to be extracted from the source image to generate the final image is equal to:

$$R_{utile} = \frac{R_{final}}{1 - \frac{R_{final}}{R_{band}}} = \frac{4/3}{1 - \frac{4/3}{5}} = \frac{20}{11}$$

The ratio $R_{utile}$ is calculated in the same way if the banner is positioned above the source image part.

Figure 4:
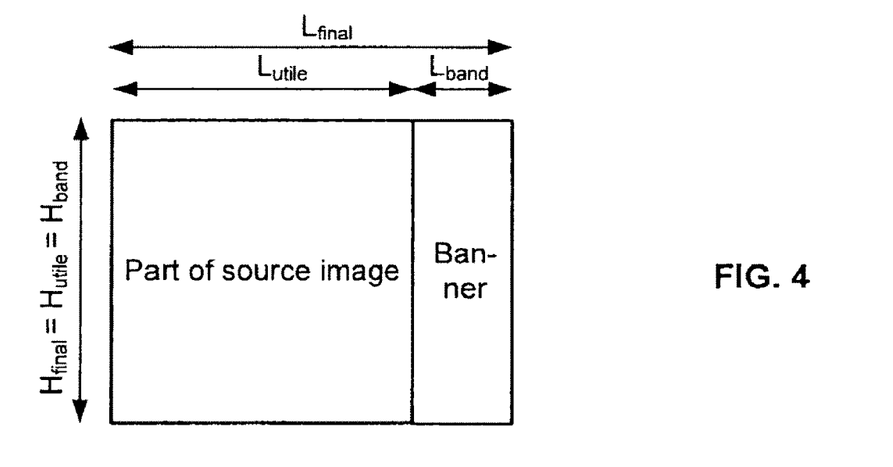
FIG. 4 shows the dimensions of the part of the source image and of the information banner composing the final image in the case where the information banner is positioned on the right side the source image part.

According to the invention, if the information banner is placed beside the part of the source image extracted as shown in FIG. 4, the useful ratio is determined in the following way:

$$R_{utile} = \frac{L_{utile}}{H_{utile}} = \frac{L_{utile}}{H_{final}} = \frac{L_{final} - L_{band}}{H_{final}} = R_{final} - R_{band}$$

Once the ratio $R_{utile}$ is determined, an image having a width to height ratio equal to $R_{utile}$ is extracted from the source image according to a step 12. This extraction can be made manually by an operator. The operator then selects a rectangular part of the source image having a width to height ratio equal to $R_{utile}$. The portion of the image selected by the operator comprises advantageously zones of perceptual interest or the highest saliency zones of the source image.

Advantageously, this extraction step is carried out automatically. This step 12 is for example realized implementing the method for image processing described in the French patent application FR 2 912 237 filed in the name of Thomson Licensing. This patent application relates more specifically to a method for image processing intended to generate, from a source image, an image of reduced size having a predetermined width to height ratio $R_{cible}$. This method is described in more detail in FIG. 5. It comprises a step 120 of selection of a rectangular part of the source image. This step is preferably carried to out from data representative of the perceptual interest of the pixels of the source image. For this purpose, a saliency map of the source image is generated, for example by applying the method described in the patent application EP 1 544 792. Such a map associates a saliency value to each pixel of the source image. This map is then binarized using a predetermined threshold. The saliency map thus generated associates a first value (e.g. zero) with each pixel of the source image if the salience value associated with said pixel is lower than the predetermined threshold or otherwise a second value (e.g. 255). A rectangle, called a bounding box and noted RE, is then defined in the source image to bound all the pixels with which are associated the second salience value. This bounding box delimits then the rectangular part of the selected image. The next step, referenced 121, consists in calculating the ratio RF between the width noted PL and the height noted PH of this rectangular part. If, during a test step 122, the ratio RF is equal to $R_{utile}$, then the image part to be extracted from the image, is the rectangular part of the image selected in step 120 contained in the bounding box. This image part is extracted in step 124. Otherwise, if the ratio RF is not equal to $R_{utile}$, the height PH or the width PL of the bounding box is modified in a step 123 so that the ratio between the width and height of the modified bounding box is equal to $R_{utile}$. More specifically, this step consists in increasing the width of the bounding box if RF is less than $R_{utile}$ and in increasing the height of the bounding box if RF is greater than $R_{utile}$.

Figure 5:
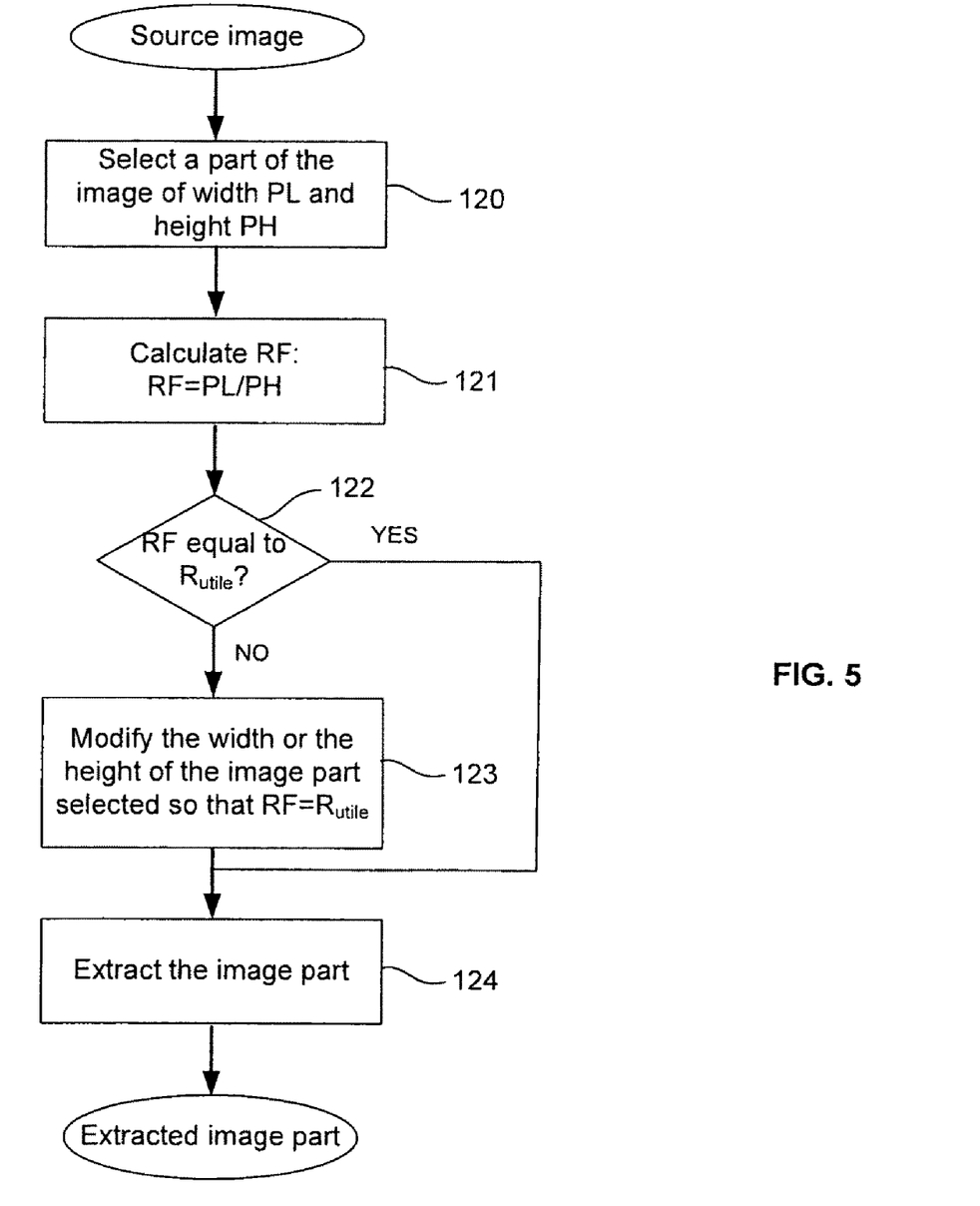
FIG. 5 shows a flow chart of the extraction step of the method described in FIG. 2.

Advantageously, the width or height of the bounding box is increased by taking into account the perceptual interest of the pixels of the source image.

In the case where RF<$R_{utile}$, the increase in width AL of the bounding box is calculated in the following way:

$$AL = PL \cdot \frac{R_{utile}}{RF} - PL$$

Figure 6:
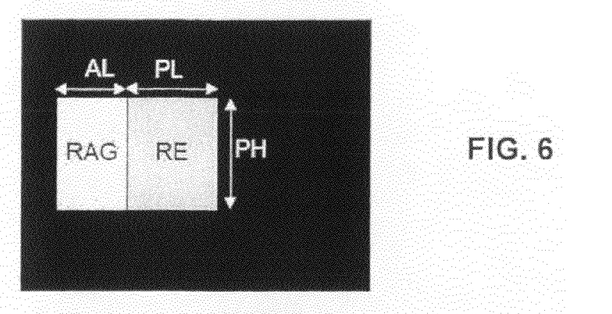
FIG. 6 shows the step of modification of the extracted part of the source image of the flow chart of FIG. 5 and shows a bounding box RE and an additional box RAG localized left of the box RE.

An average salience value is calculated in an additional rectangle RAG, of width AL and height PH, positioned on the left side of the bounding box RE as shown in FIG. 6. The average salience SMG of the additional rectangle RAG is calculated as follows:

$$SMG = \frac{1}{nag} \cdot \sum_{p \in RAG} S_p$$

where nag is the number of pixels in the additional rectangle RAG and $S_p$ is the salience value of a pixel p.

Figure 7:
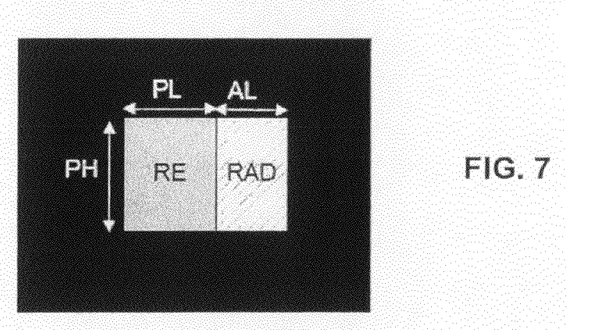
FIG. 7 shows the step of modification of the extracted part of the source image of the flow chart of FIG. 5 and shows a bounding box RE and an additional box RAD localized right of the box RE.

In the same way, an average salience value is calculated in an additional rectangle RAD, of width AL and height PH, positioned on the right side of the bounding box RE as shown in FIG. 7. The average salience SMD of the additional rectangle RAG is calculated as follows:

$$SMD = \frac{1}{nad} \cdot \sum_{p \in RAD} S_p$$

where nad is the number of pixels in the additional box RAD. The rectangles RAD and RAG being the same size, nad=nag.

An overall average salience value SMT is then calculated as follows: SMT=SMG+SMD. The increase ALG in width on the left is calculated as follows:

$$ALG = \frac{SMG \cdot AL}{SMT}$$

Likewise, the increase ALD in width on the right is calculated as follows:

$$ALD = \frac{SMD \cdot AL}{SMT}$$

Figure 8:
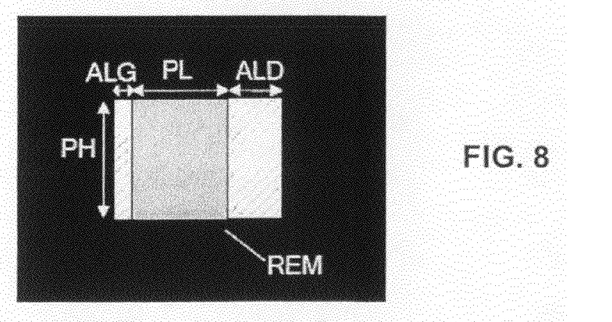
FIG. 8 shows the step of modification of the extracted part of the source image of the flow chart of FIG. 5 and shows an additional box modified REM according to the method of the invention.

The modified bounding box REM is shown in FIG. 8. It has a height equal to PH and a width equal to ALG+ALD+PL, i.e. equal to AL+PL. Hence, the ratio between the width and the height of the modified bounding box REM is equal to (AL+PL)/PH, i.e. equal to $P*R_{utile}/(RF*PH) = R_{utile}$.

In the case where RF>$R_{utile}$, the increase in width AH of the bounding box is calculated in the following way:

$$AH = PH \cdot \frac{RF}{R_{utile}} - PH$$

Figure 9:
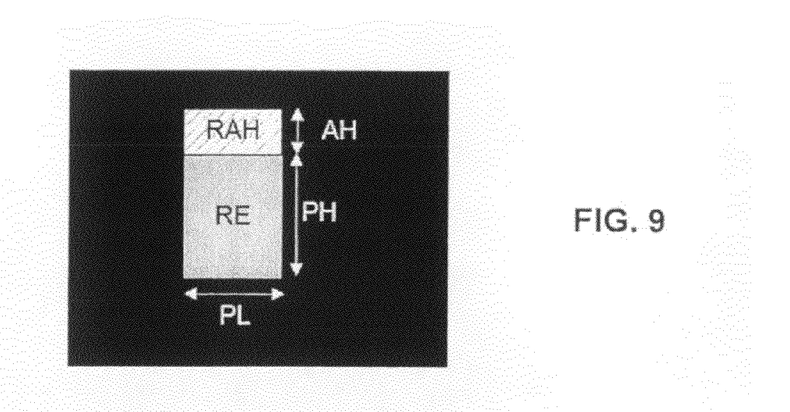
FIG. 9 shows the step of modification of the extracted part of the source image of the flow chart of FIG. 5 and shows a bounding box RE and an additional box RAH localized above the box RE.

An average salience value is calculated in an additional rectangle RAH, of width PL and height AH, positioned above the bounding box RE as shown in FIG. 9. The average salience SMH of the additional rectangle RAH is calculated as follows:

$$SMH = \frac{1}{nah} \cdot \sum_{p \in RAH} S_p$$

where nah is the number of pixels in the additional box RAH.

Figure 10:
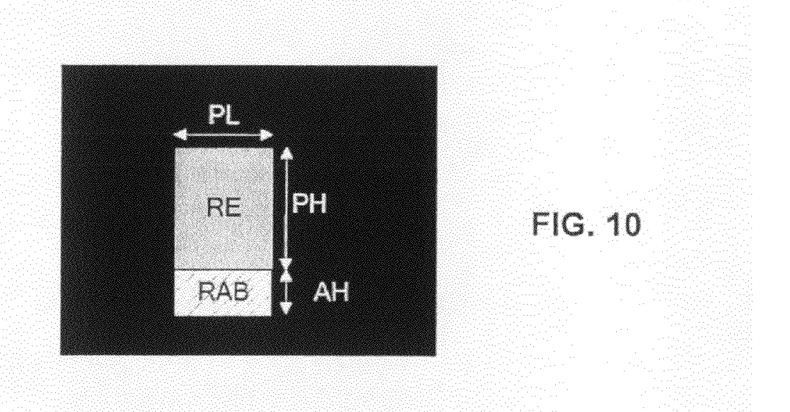
FIG. 10 shows the step of modification of the extracted part of the source image of the flow chart of FIG. 5 and shows a bounding box RE and an additional box RAB localized below the box RE.

In the same way, an average salience value is calculated in an additional rectangle RAB, of width PL and height AH, positioned below the bounding box RE as shown in FIG. 10. The average salience SMB of the additional rectangle RAB is calculated as follows:

$$SMB = \frac{1}{nah} \cdot \sum_{p \in RAB} S_p$$

where nab is the number of pixels in the additional box RAB. The rectangles RAH and RAB being the same size, nab=nah.

An overall average salience value SMT is then calculated as follows: SMT=SMB+SMH. The increase AHH in height upwards is calculated as follows:

$$AHH = \frac{SMH \cdot AH}{SMT}$$

Likewise, the increase AHB in height downwards is calculated as follows:

$$AHB = \frac{SMB \cdot AH}{SMT}$$

Figure 11:
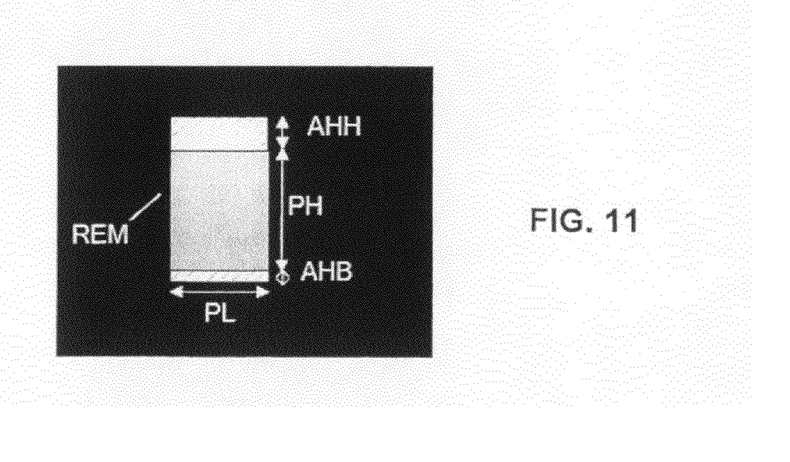
FIG. 11 shows the step of modification of the extracted part of the source image of the flow chart of FIG. 5 and shows an additional box modified REM according to the method of the invention.

The modified bounding box REM is shown in FIG. 11. It has a height equal to AHH+AHB+PH, i.e. equal to AH+PH and a width equal to PL. Hence, the ratio between the width and the height of the modified bounding box REM is equal to PL/(AH+PH), i.e. equal to PL/(PH*RF/$R_{utile}$)=$R_{utile}$.

Step 124 consists in extracting from the source image the part of the image delimited by the modified bounding box REM.

Finally, again in reference to FIG. 2, step 13 of the method consists in generating a final image from the image part extracted in step 12 and an information banner selected in step 10, a final image having a width and a height equal to $L_{final}$ and $H_{final}$ respectively and comprising in juxtaposition an image representative of said extracted image part having a width to height ratio equal to $R_{utile}$ and an image representative of said information banner having a width to height ratio equal to $R_{band}$.

The image representative of the image part extracted in step 12 is a sub-sampled image of this image part if the width of this image is greater than $L_{final}$ and an over-sampled image of this image part if the width of this image part is less than said $L_{final}$. In both cases, the sub-sampling or over-sampling is carried out conjointly in width and height, that is to say so as to keep the width to height ratio $R_{utile}$ of the image part extracted in step 12.

Likewise, the image representative of the information banner selected in step 10 is an image sub-sampled of this banner if the width of this banner is greater than $L_{final}$ and an image over-sampled of this banner if the width of this banner is less than said $L_{final}$. In both cases, the sub-sampling or over-sampling is carried out in width and height so as to keep the width to height ratio $R_{band}$ of the banner selected in step 12.

Figure 12:
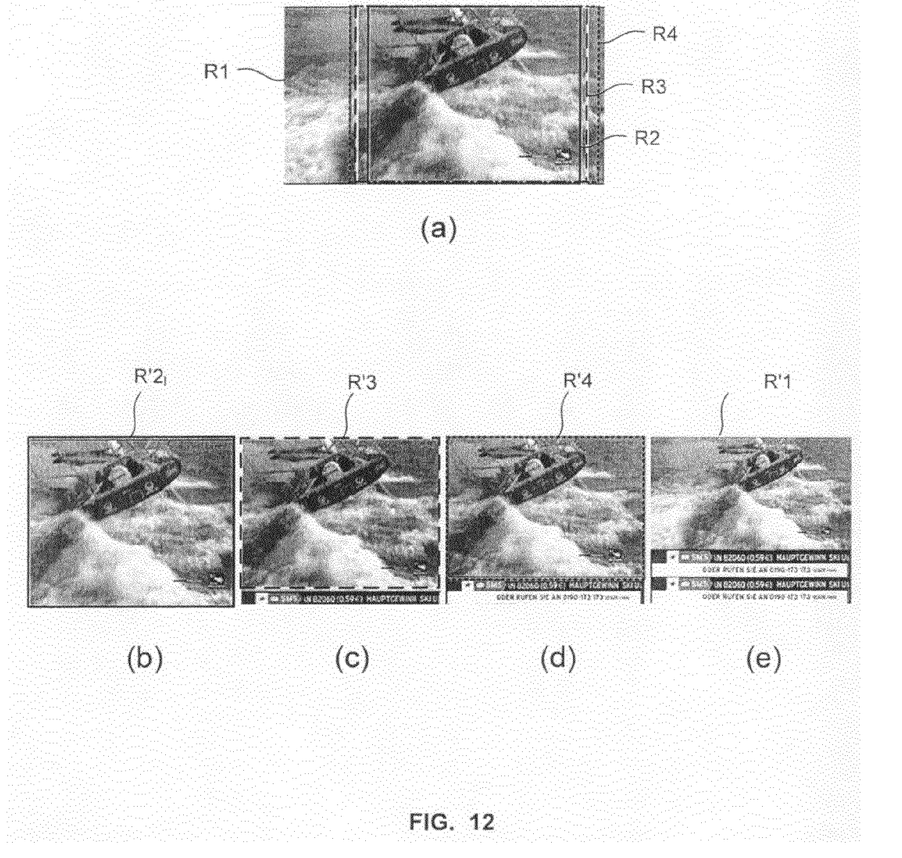
FIGS. 12(a) to 12(e) represent final images generated by the method of the invention, for a plurality of banners having different width to height ratios.

FIGS. 12(b) to 12(e) show the results of the method of the invention applied to a source image shown in FIG. 12(a). The source image is delimited by a rectangle R1 in FIG. 1(a). The width to height ratio $R_{initial}$ of the source image is equal to the ratio of the width of the rectangle R1 to the height of the rectangle R1. FIG. 12(b) shows the case where the source image is converted into an image having a width to height ratio $R_{final}$ less than $R_{initial}$ without insertion of the information banner (case where the height of the information banner is null). Then $R_{final}=R_{utile}$. The image part that is extracted from the source image in step 12 is then delimited by a rectangle R2 in FIG. 12(a). The ratio $R_{utile}$ of this image part is equal to the ratio of the width of rectangle R2 to the height of rectangle R2. The final image displayed is a sub-sampled image of the image contained in the rectangle R2 when the width of the image contained in the rectangle R2 is greater than the width of the final image and an over-sampled image of the image contained in the rectangle R2 when the width of the image contained in the rectangle R2 is less than the width of the final image. This sub-sample or over-sampled image is delimited by a rectangle R'2 in FIG. 12(b).

FIG. 12(c) shows the case where the source image is kept in an image comprising a first information banner. The image part that is extracted from the source image is then delimited by a rectangle R3 in FIG. 12(a). The ratio $R_{utile}$ of this image part is equal to the ratio of the width of rectangle R3 to the height of rectangle R3. The final image displayed comprises the information banner and a sub-sampled or over-sampled image of the image contained in the rectangle R3. The image is sub-sampled when the width of the image contained in the rectangle R3 is greater than the width of the final image and is over-sampled when the width of the image contained in the rectangle R3 is less than the width of the final image. This sub-sampled or over-sampled image is delimited by a rectangle R'3 in FIG. 12(c).

The FIG. 12(d) shows the case where the source image is converted into an image comprising an information banner having a doubled height with respect to the banner of FIG. 12(c). The image part that is extracted from the source image is then delimited by a rectangle R4 in FIG. 12(a). The ratio $R_{utile}$ of this image part is equal to the ratio of the width of rectangle R4 to the height of rectangle R4. The final image displayed comprises the information banner of double height and a sub-sampled or over-sampled image of the image contained in the rectangle R4. The image is sub-sampled when the width of the image contained in the rectangle R4 is greater than the width of the final image and is over-sampled when the width of the image contained in the rectangle R4 is less than the width of the final image. This sub-sampled or over-sampled image is delimited by a rectangle R'4 in FIG. 12(d).

Finally, the FIG. 12(e) shows the case where the source image is converted into an image comprising an information banner having a quadrupled height with respect to the banner of FIG. 12(c). The image part that is extracted from the source image is then delimited by the rectangle R1 in FIG. 12(a). The ratio $R_{utile}$ of this image part is therefore equal to the ratio $R_{initial}$ as RI bounds the totality of the source image. The final image displayed comprises the information banner of quadruple height and a sub-sampled or over-sampled image of the source image. The image is sub-sampled when the width of the image contained in the rectangle R1 is greater than the width of the final image and is over-sampled when the width of the image contained in the rectangle R1 is less than the width of the final image. This sub-sampled or over-sampled image is delimited by a rectangle R'1 in FIG. 12(e).

As can be seen in FIGS. 12(b) to 12(e), the width to height ratio of the part of the source image extracted is linked to the width to height ratio of the information banner. The final image displayed does not comprise black bands and is not deformed.

This new method is an alternative choice to the standard format conversion methods shown in FIGS. 1(b) to 1(d).

Figure 13:
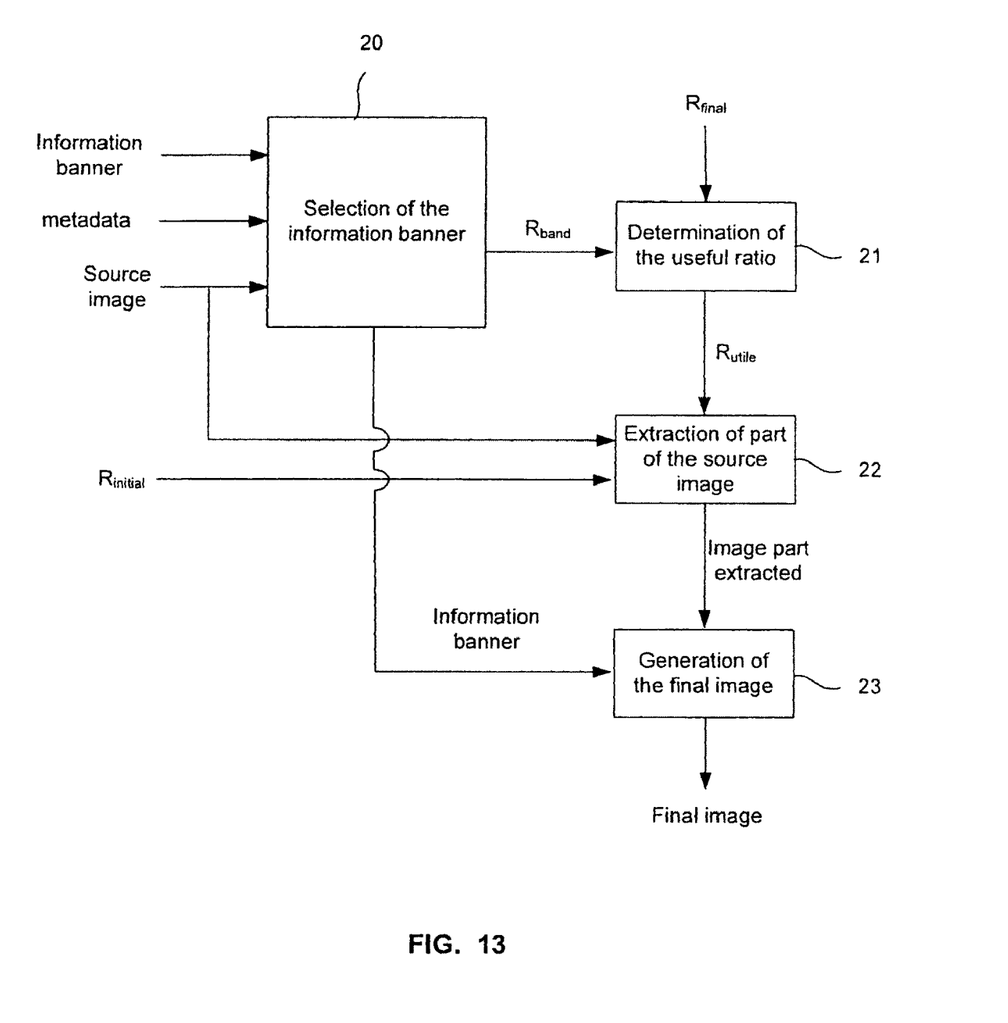
FIG. 13 represents schematically a device able to implement the invention.

FIG. 13 shows a device able to implement the method of FIG. 2. It comprises a selection block 20 to select the information banner. An information banner is selected from a plurality of information banners. This selection is for example carried out using the metadata associated with the source image to be processed. These metadata concern for example the content of the source image. They are compared with the data or metadata associated with the information banner and concerning their content. The information banner whose content is best matched with the content of the source image is selected. The width to height ratio $R_{band}$ of the banner selected is transmitted to a calculation block 21 charged with determining, from the $R_{final}$ and $R_{band}$ ratio, the useful ratio $R_{utile}$. This block 21 implements step 11 previously described in reference to FIG. 2. The ratio $R_{utile}$ thus calculated is then transmitted to an extraction block 22 charge with extraction from the source image of an image part having a width to height ratio equal to $R_{utile}$. This block 22 implements step 12 described previously in reference to FIG. 2. Finally, a block 23 is charged with generating a final image from the information banner selected by the block 20 and the part of the source image extracted by block 22. This block 23 implement step 13 described previously in reference to FIG. 2.

Naturally, the invention is not limited to the embodiment examples mentioned above. In particular, persons skilled in the art may apply any variant to the stated embodiments and combine them to benefit from their various advantages.

The method described can be implemented every time a format conversion is required.

What is claimed is:

1. Method for image processing to generate, from a source image having a predefined width to height ratio, called initial ratio, and an information banner having predefined width to height ratio, called banner ratio, a final image having a width called final and a height called final and for which the width to height ratio, called final ratio, is different from said initial ratio, wherein it comprises the following steps:

determine, from said final ratio and said banner ratio, a width to height ratio, called useful ratio, of an image called useful ratio, an image called useful so that, for a useful image and an information banner having a width equal to a final width, the height of the useful image is equal to the difference between the final height and the height of the information banner or so that, for a useful image and an information banner having a height equal to the final height, the width of the useful image is equal to the difference between the final width and the width of the information banner, extract from the source image a part of the image having a width to height ratio equal to the useful ratio, and generate, from the part of the image extracted and the information banner, a final image comprising in juxtaposition an image representative of said extracted image part having a width to height ratio equal to the useful ratio and an image representative of said information banner having a width to height ratio equal to the banner ratio.

2. Method according to claim 1, wherein said extracted image part is determined according to zones of perceptual interest of the source image.

3. Method according to claim 1, wherein said image representative of said extracted image part is a sub-sampled image of the image part extracted if the width of said extracted image part is greater than said final width and an over-sampled image of the image part extracted if the width of said extracted image part is less than said final width, in that said image representative of said information banner is a sub-sampled image of said information banner if the width of said information banner is greater than said final width and an over-sampled image of said information banner if the width of said information banner is less than said final width.

4. Method according to claim 1, wherein it comprises a preliminary step of selection of an information banner according to the metadata associated with said source image.

5. Method according to claim 1, wherein said metadata are to information on the content of said source image.

\* \* \* \* \*